United States Patent
Rowland et al.

(10) Patent No.: US 6,634,904 B2
(45) Date of Patent: Oct. 21, 2003

(54) AIRPLANE SEAT COMPUTER CONNECTION

(75) Inventors: Willie P. Rowland, Mill Creek, WA (US); Donald B. Lee, Shoreline, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/970,274

(22) Filed: Oct. 3, 2001

(65) Prior Publication Data

US 2003/0064623 A1 Apr. 3, 2003

(51) Int. Cl.[7] .............................................. H01R 13/60
(52) U.S. Cl. ..................... 439/534; 439/34; 439/535
(58) Field of Search ...................... 248/274.1; 439/502, 439/534, 535, 638, 639, 910, 34

(56) References Cited

U.S. PATENT DOCUMENTS

| 5,451,092 | A | * | 9/1995 | Gray .......................... 297/122 |
| 5,769,369 | A | * | 6/1998 | Meinel .................... 248/176.1 |
| 5,836,783 | A | * | 11/1998 | Morisawa et al. .......... 439/502 |
| 6,007,036 | A | * | 12/1999 | Rosen ..................... 248/286.1 |
| 6,034,688 | A | * | 3/2000 | Greenwood et al. ........ 345/784 |
| 6,038,426 | A | * | 3/2000 | Williams, Jr. ................ 725/77 |
| 6,092,868 | A | * | 7/2000 | Wynn ..................... 297/217.3 |
| 6,257,923 | B1 | * | 7/2001 | Stone et al. ................ 439/502 |
| 6,386,724 | B2 | * | 5/2002 | Naghi .......................... 362/85 |

* cited by examiner

*Primary Examiner*—Tho D. Ta
*Assistant Examiner*—James R. Harvey
(74) *Attorney, Agent, or Firm*—Harness Dickey & Pierce P.L.C.

(57) ABSTRACT

A flexible computer connection attaches to a passenger seat in an airplane to supply a personal computer used by a passenger with electrical power and communications with an external location such as a ground source for telecommunications and connecting to the internet.

17 Claims, 3 Drawing Sheets

AIRPLANE SEAT COMPUTER CONNECTION

FIELD OF THE INVENTION

The present invention relates generally to a connection for a computer, and more particularly, the present invention relates to a connection for a computer that utilizes a flexible support structure for the computer connection.

BACKGROUND OF THE INVENTION

With the advent of the telecommunications and the computer age, individuals are constantly in need of electronic contact with external sources such as telecommunications networks and the internet. This direction is exemplified by the increase and advancement in wireless technology including cellphones, wireless LANs and wireless modems. Such wireless technology allows individuals to communicate with other individuals and connect to computer networks and the internet from remote areas such as inside automobiles, camp sites, and vacation resorts. As a result, individuals are able to perform their jobs and maintain communication while travelling and at locations far outside the office, thereby transforming the traditional brick and mortar office environment into a virtual office space.

While wireless technology is heavily used in land based locations such as land vehicles, it has not as-of-yet found widespread use in certain types of transportation. Specifically, the use of wireless technology on airplanes has not been penetrated due to the great distance between the remote computer or cellular device and the cellular hub as well as the restrictions placed upon passengers due to potential interference of the transmitting cellular device with the airplane's navigation systems. To overcome this, some airplane manufacturers have provided a single wireless link to allow passengers in the airplane to connect to a ground based cellular link for connection to a cellular or computer network. While this technological advancement serves to provide adequate transmission power to reach ground based connections and does not interfere with the airplane's navigational systems, the logistics of properly connecting to a passenger's individual computer still remains to be achieved and refined. Specifically, due to the space restrictions in airplanes and in airplane seats, such connections are difficult to establish in light of the logistics of passenger placement and cabin layout. The present invention was developed in light of these and other drawbacks.

SUMMARY OF THE INVENTION

To overcome these and other drawbacks, the present invention provides a personal computer connecting device that has a combined reading light and PC connection port especially adapted for use with an airplane seat on an airplane. The personal computer connecting device comprises a PC connector forming a communications port, a communication line connecting the PC connector to a transmission device that transmits information to or from the personal computer with ground station external to the airplane, and a flexible support structure supporting the communication line and the PC connector. Accordingly, the present invention provides a quick and efficient PC connection even in light of the small size constraints in an airplane.

In another aspect, the personal computer connecting device for connecting a personal computer in an airplane to a ground terminal includes a PC connector, a communications wire connecting the PC connector to a transmission device for transmitting or receiving with the ground station, a light source, a light power wire connecting the light source to a power supply to supply power to the light source, a power connector, a power supply wire connecting the power connector to the power source, and a flexible support structure. The flexible support structure has an outer sheath and a peripheral support connected to a first end of the outer sheath. The peripheral support supports the power connector, light source and PC connector. A base is connected to a second end of the outer sheath.

In another aspect, an airplane comprises a fuselage, a passenger seat positioned inside the fuselage, a personal computer connecting device connected to the passenger seat. The personal computer connecting device comprises a PC connector, a communications wire connecting the PC connector to a transmission device for transmitting or receiving with a ground station, a light source, a light power wire supplying power from a power source to the light source, a flexible support structure supporting the PC connector and the light source at a first end. The flexible support structure is attached to the passenger seat at a second end.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figures 1, 2:
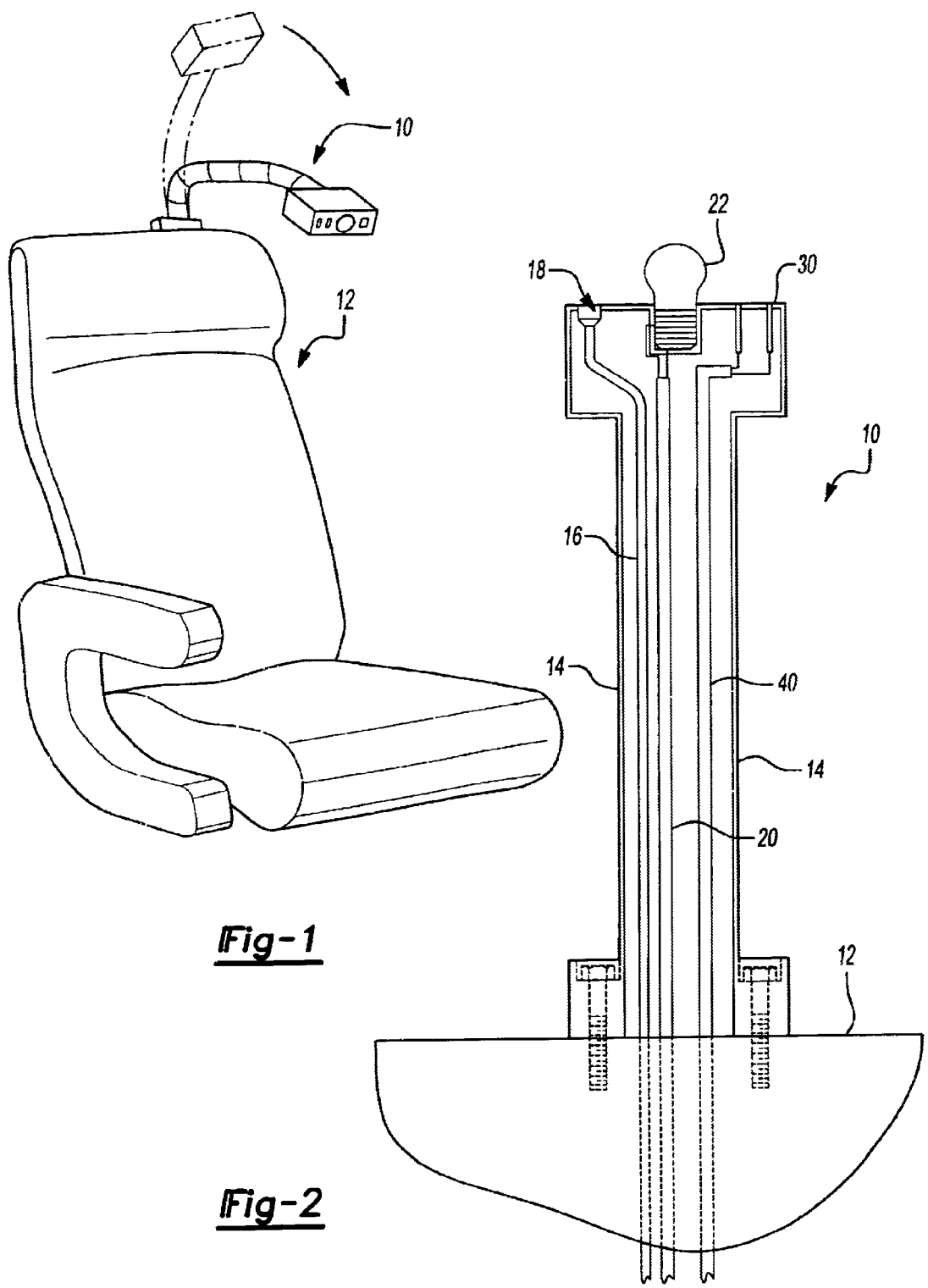
FIG. 1 is a perspective view of a flexible computer connection attached to a passenger's seat according to the present invention.
FIG. 2 is a schematic view of a flexible computer connection according to the present invention.

Referring now to FIG. 1, a flexible computer connection 10 is shown attached to a passenger seat 12. Passenger seat 12 can be any passenger seat, pilot seat or other seat in a commercial or any other type of aircraft. Such seats may be found in first, business or tourist class. Likewise, such seats may be used by the pilot, copilot or navigator or other flight crew member. A plurality of different types of designs of such seats exist in the present state of the art, and that shown and described in FIG. 1 is merely exemplary in nature.

Referring now to FIG. 2, the flexible computer connection 10 is described in greater detail. Flexible computer connection 10 has an outer sheath 14 that contains internal wiring required to carry signals to and from a personal computer used by a passenger, supply power to the personal computer and supply power to a light bulb to illuminate the personal computer. Communications wire 16 extends up from seat 12, through outer sheath 14 and terminates at PC connector 18. PC connector 18 is preferably an RJ-45 phone connection allowing traditional, ethernet or other transmission and reception to and from a personal computer. However, PC connector 18 can also be another type of connector including a parallel port, serial port, USB, or other type connector. The end of communications wire 16, opposite PC connector 18, connects to the external transmission device of the airplane on which passenger seat 12 is attached.

Light power wire 20 extends from passenger seat 12, through outer sheath 14 and terminates at light bulb 22 to provide illumination to a passenger seated in passenger seat 12. At an end of light power wire 20, opposite to light bulb 22, light power wire 20 has its source at a 12 volt DC, 110 AC or other onboard power source contained in the airplane supporting passenger seat 12. As such, light bulb 22 provides illumination for a passenger during reading, use of a personal computer or other activity requiring illumination.

Referring to FIG. 2, the power supply wire 40 extends through passenger seat 12 to connect to a power supply source for the supply of power to power connector 30. As such, a passenger's PC can plug directly into power connector 30 for power supply thereof. Similar to light bulb 22, the power supply wire 40 has its source at a 12 volt DC, 110 AC or other onboard power source.

Figure 6:
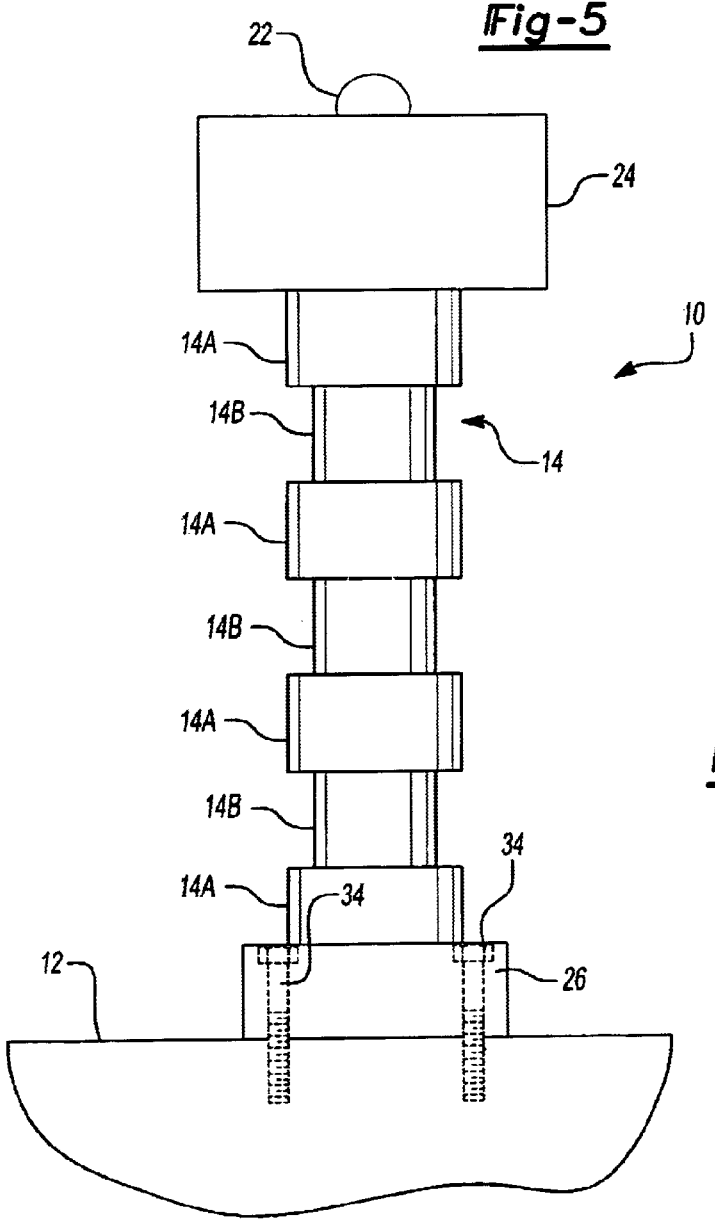
FIG. 6 is a plan view of a flexible computer connection according to the present invention.

Referring now to FIG. 6, outer sheath 14 is shown attached to peripheral support 24 and base 26. Preferably, outer sheath 14 includes a plurality of large diameter sections 14a telescopingly and slidingly arranged outside smaller diameter sections 14b. The slidingly arrangement between large diameter sections 14a and small diameter sections 14b allow outer sheath 14 to be flexed and bent into a plurality of positions to allow light bulb 22 to properly illuminate a desired area and to allow PC connector 18 and power connector 30 to be positioned in a suitable location. However, it should be noted that other flexible devices that allow the flexible computer connection 10 to be repositioned may be used and that the flexible support described in the present invention is merely an example. Such other devices may include, but are not limited to, wire mesh, flexible nylon or other suitable constructions.

Peripheral support 24 is preferably made of a plastic or other type material and is rigid to provide suitable support for PC connector 18, light bulb 22 and power connector 30. More specifically, peripheral support has a front face having apertures for the support of the PC connector 18, light bulb 22 and power connector 30. Preferably, peripheral support 24 is rectangular shaped as shown in the figure.

Likewise, base 26 is made of a rigid material and has screws 34 that pass through base 26 to connect the flexible computer connection 10 to passenger seat 12. The heads of screws 34 fit into countersinks in base 26 to eliminate any exposed areas on the screws 34. However, it should be noted that base 26 can be attached to passenger seat by any other suitable method, including gluing, adhesion and forming base 26 as one unit with passenger seat 12. The face of base 26 that attaches to the passenger seat 12 is preferably contoured to provide the maximum tight fit. Specifically, if passenger seat 12 has a curved surface, the face of base 26 is also curved to match this contour. This ensures maximum adherence of base 26 to passenger seat 12.

Figure 4:
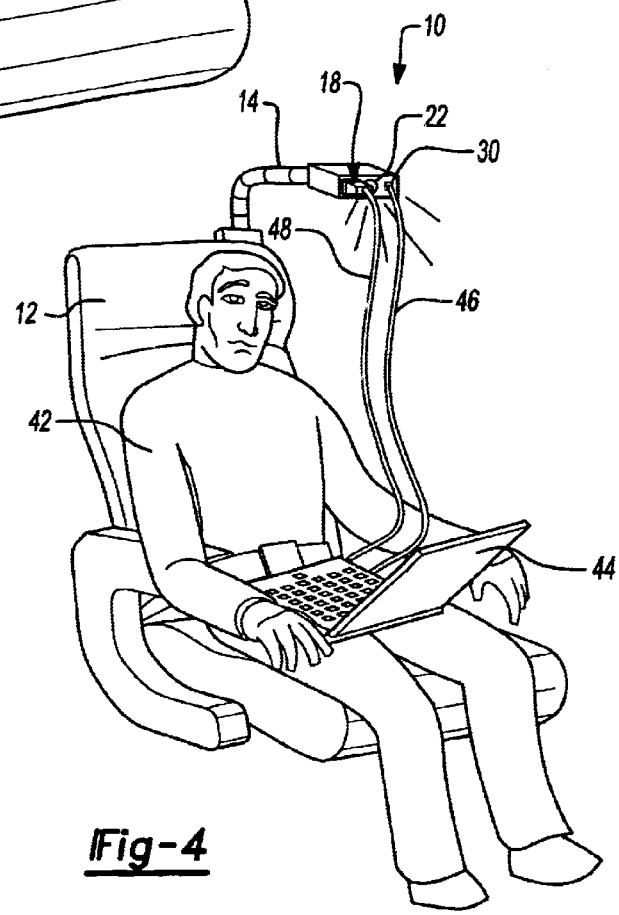
FIG. 4 is a perspective view of a flexible computer connection attached to a passenger's seat being used by a passenger according to the present invention.

Referring now to FIG. 4, a passenger 42 positioned in passenger seat 12 utilizes combined snake reading light 10 to operate PC 44. Accordingly, outer sheath 14 is shown flexed into a suitable position such that light bulb 22 is able to supply proper illumination to PC 44 for operation by passenger 42. Likewise, PC communication wire 46 attaches PC 44 to PC connector 18. And, power connector 30 supplies power to PC power wire 48 to power PC 44.

Figure 3:
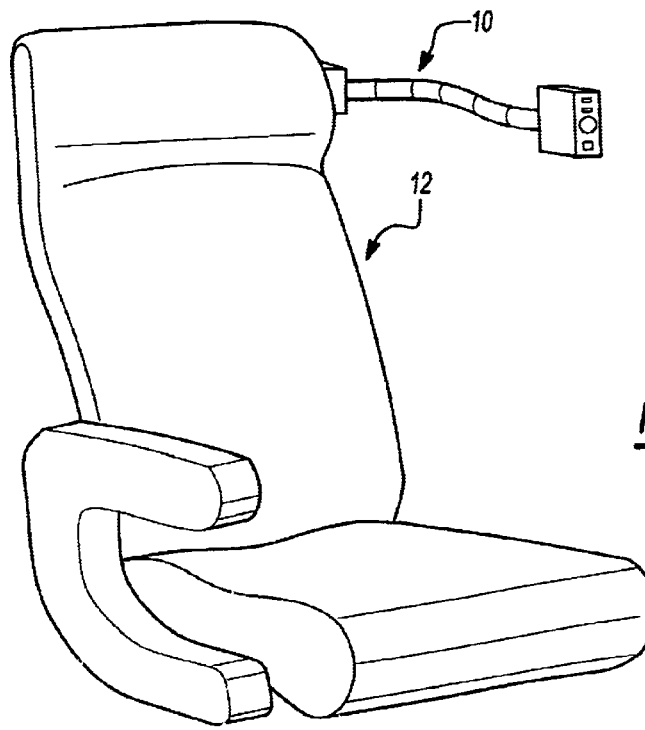
FIG. 3 is a perspective view of a flexible computer connection used on a passenger's seat according to the present invention.
Figure 5:
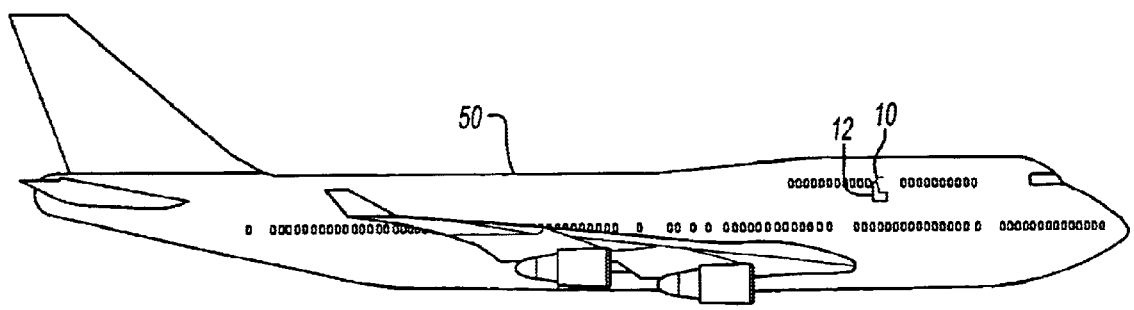
FIG. 5 is a plan view of a flexible computer connection being used on a passenger seat in an airplane according to the present invention.

Accordingly, passenger 42 can maneuver the combined snake reading light 10 into any desired position to ensure that PC communication wire does not interfere with getting into or out of passenger seat 12. Likewise, power connector is positioned, by movement of the flexible computer connection 10, into a suitable position to maximize comfort of the passenger 42. Alternatively, as shown in FIG. 3, the flexible computer connection 10 can be mounted on a side of seat 12. In FIG. 5, airplane 50 is shown having passenger seat 12 with flexible computer connection 10 according to the present invention.

It will be appreciated that while the present invention has been described in connection for use with an airplane, that the invention could just as easily be used in other aircraft, or virtually any other mobile or stationary platform where it is desired to provide an adjustably positionable communications port for the user. Thus the present invention provides an adjustable and positionable PC connector.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An adjustably positionable person computer connecting device adapted to couple a computing device to a main communication line, the person computer connecting device comprising:

a PC connector;

a light source for illuminating a work area;

a flexible support structure supporting and encapsulating a power supply conductor, a light power conductor and a communications conductor, the flexible support structure supporting the PC connector at a first end and being adapted to be fixedly coupled to a support structure so as to project from the support structure;

the communication conductor being connected to the PC connector the communication conductor passing through a second end of the flexible support structure for attaching to the main communication line for communicating with the main communication line; and wherein the light source is coupled to the flexible support structure and a discrete power source.

2. The personal computer connecting device as claimed in claim 1, wherein the light source is supported by the flexible support structure at the first end and the light source is connected to the discrete power source by the light power conductor.

3. The personal computer connecting device as claimed in claim 1, wherein the flexible support structure comprises:

an outer sheath;

a peripheral support connected to a first end of the outer sheath that supports the PC connector; and a base connected to a second end of the outer sheath.

4. The personal computer connecting device as claimed in claim 3, wherein the outer sheath comprises a plurality of large diameter sections and a plurality of small diameter sections, the plurality of large diameter sections telescopingly and slidingly engaged with the plurality of small diameter sections to allow the flexible support structure to be flexible.

5. The personal computer connecting devices as claimed in claim 3, wherein the base comprises apertures to support bolts for attachment to the support structure.

6. The personal computer connecting device as claimed in claim 1, further comprising a power connector supported at the first end, the power connector connected to a power source by the power supply conductor for supplying power to the personal computer.

7. The personal computer connecting device as claimed in claim 1, wherein the PC connector comprises a parallel port connector.

8. The personal computer connecting device as claimed in claim 1, wherein the PC connector comprises a serial port connector.

9. The personal computer connecting device as claimed in claim 1, wherein the PC connector comprises a USB connector.

10. The personal computer connecting device as claimed in claim 1, wherein the PC connector comprises a RJ-45 connector.

11. A personal computer connecting device for connecting a personal computer to a ground terminal external to the mobile platform, the personal computer connecting device comprising:
- a PC connector;
- a communications wire connecting the PC connector to a transmission device in the mobile platform, the transmission line device for communicating with the ground terminal;
- a light source for illuminating a work area;
- a light power wire connecting the light source to a power supply to supply power to the light source;
- a power connector;
- a power supply wire connecting the power connector to the power source; the flexible support structure supporting and encapsulating the power supply wire, light power wire and communications wire, the flexible support structure comprising:
  - an outer sheath;
  - a peripheral support connected to a first end of the outer sheath, the peripheral support that supports the power connector, light source and PC connector; and
  - a base connected to a second end of the outer sheath.

12. The personal computer connecting device as claimed in claim 11, wherein the outer sheath comprises a plurality of large diameter sections and a plurality of small diameter sections, the plurality of large diameter sections telescopingly and slidingly engaged with the plurality of small diameter sections to allow the flexible support structure to flex.

13. An aircraft comprising:
- a fuselage;
- a passenger seat positioned inside the fuselage;
- a personal computer connecting device connected to the passenger seat, the personal computer connecting device comprising:
  - a PC connector;
  - a communications wire connecting the PC connector to a transmission device for transmitting or receiving with a ground station;
  - a fight source for illuminating a work area;
  - a light power wire supplying power from a power source to the light source; and
  - a flexible support structure, the flexible support structure supporting the PC connector and the light source at a first end, the flexible support structure attached to the passenger seat at a second end, the flexible support structure supporting and encapsulating the light power wire and the communications wire.

14. The aircraft as claimed in claim 13, wherein the second end of the flexible support structure is attached to a top portion of the passenger seat.

15. The aircraft as claimed in claim 13, wherein the second end of the flexible support structure is attached to a side area of the passenger seat.

16. The aircraft as claimed in claim 13, further comprising a power connector connected to a power source by a power supply line, the power connector and power supply supported by the flexible support structure.

17. The aircraft as claimed in claim 13, wherein the PC connector is connected to the personal computer by a PC communications wire and the power connector is connected to the personal computer by a PC power wire.

* * * * *

UNITED STATES PATENT AND TRADEMARK OFFICE
CERTIFICATE OF CORRECTION

PATENT NO. : 6,634,904 B2
DATED : October 21, 2003
INVENTOR(S) : Willie P. Rowland and Donald B. Lee It is certified that error appears in the above-identified patent and that said Letters Patent is hereby corrected as shown below:

Column 4,
Line 31, delete "person" and insert -- personal --.
Line 33, delete "person" and insert -- personal --.

Column 6,
Line 19, delete "fight" and insert -- light --.

Signed and Sealed this

Sixteenth Day of March, 2004

JON W. DUDAS
*Acting Director of the United States Patent and Trademark Office*